UNITED STATES PATENT OFFICE.

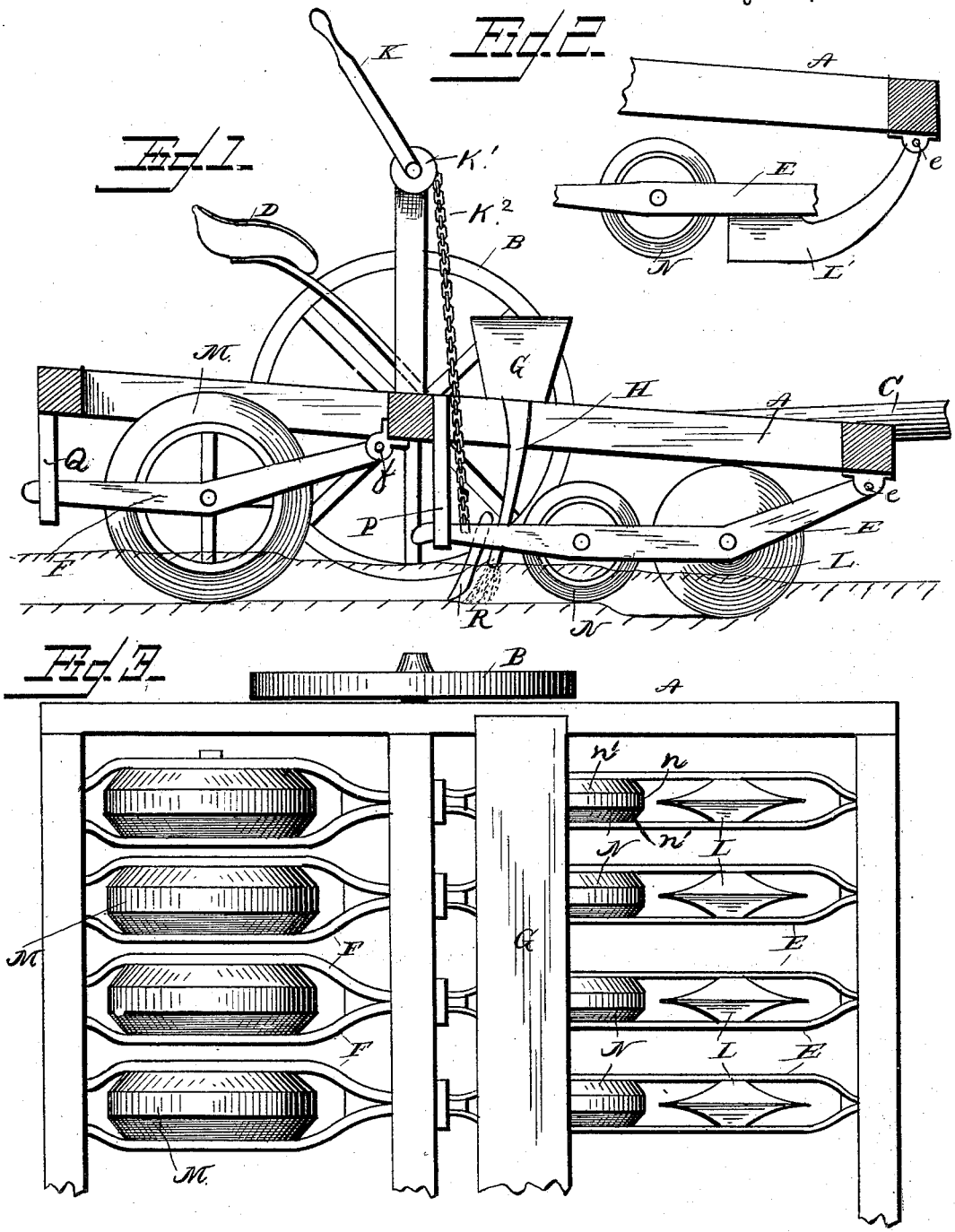

JOHN RANKIN NEWTON, OF CARTHAGE, ILLINOIS.

SEED-PLANTER.

SPECIFICATION forming part of Letters Patent No. 298,880, dated May 20, 1884.

Application filed February 21, 1884. (No model.)

*To all whom it may concern:*

Be it known that I, JOHN R. NEWTON, a citizen of the United States, residing at Carthage, in the county of Hancock and State of Illinois, have invented certain new and useful Improvements in Seed-Planters, of which the following is a specification, reference being had therein to the accompanying drawings.

This invention consists in an improved seed-planter adapted for planting winter-wheat and like uses, which I make and use substantially as set forth hereinafter and as shown in the accompanying drawings, in which—

Figure 1 is a sectional elevation of the planter. Fig. 2 is a modified part of same. Fig. 3 is a top view of part of same.

The planter has a main frame, A, mounted on two wheels, B, and provided with tongue C, seat D, lever K, and a number of sets of depending frames, E F, furrow-openers L, seed-bed rollers N, seed-boxes G, dropping-tubes H, coverers R, cover-rollers M, and other parts to complete the apparatus for planting several rows at one passage. The frames E are each separately pivoted in front at *e* to the main frame, and arranged to rise and fall freely in slots in holders P behind, which prevents lateral motion. The lever K is fixed to shaft K', which is pivoted to an elevated part of frame A, across which it extends, (not shown in Fig. 3,) and is connected by holder-chains K² to the back ends of the frames E in such way as to leave them all free for separate vertical motion while at work, but so that by moving the lever all the frames will be lifted, when required, for passing obstructions or traveling, and can be lowered again for work. The frames E bear each a furrow-opener, L or L', a seed-bed roller, N, and a coverer, R. The furrow-opener L is formed like a rolling-cutter, sharp at the cutting-edge and wedge-shaped back therefrom, so as to cut and open a furrow for the seed. A runner, L', made like the furrow-opener of a corn-planter, is sometimes substituted for this, as in Fig. 2. The seed-bed roller N has a flat tread, *n*, and beveled sides *n' n'*, and is hung in frame E behind opener L, so as to run in its furrow and roll the bottom and sides firm and even to form a uniform bed to receive the seed. The sides are beveled, so as to form smooth, even, and inclined walls to the seed-bed, to avoid unevenness and filling up and to promote uniform planting and covering. The seed-boxes G and the dropping mechanism are of any suitable construction. The seed-tubes H project down, so as to deposit the seed in the seed-beds back of rollers N. The coverers R project down from frames E back of seed-tubes H. They are adjustable, so as to follow in the seed-beds and scrape enough loose earth from their rolled sides to properly cover the seed. They are formed with their lower ends bent backward and of shape approximating those of the seed-beds. The frames F are pivoted in front to the main frame at *f*, and are held from lateral motion behind by slots in holders Q, while separately free to rise and fall as they are drawn along. These frames may be provided with means for lifting to turn or travel like those in front; and, if desired, this frame F may have its ends and connections reversed, so that its free end may be lifted by the same means as the front frames. The front and rear floating frames, E F, are capable of rising and falling together or independently. They bear heavy roller-wheels M of form like rollers N, but wider, which are arranged to run in the seed-beds behind the coverers and roll the earth on the seeds, making the beds wider and deeper and rolling their sides firm and compact to form ridges between the rows of plants adapted to stand and endure into the winter, and as they slowly weather down cover and protect the roots and help them to resist heaving out and winter killing.

Several of the parts admit of modification in construction and arrangement when desired.

It will be seen that I provide means to open the furrow, to roll the seed-bed, to drop the seed, to cover, and to roll the earth on them in a depressed furrow with ridges between rolled even and compact, doing each of these by simple, direct, and efficient means, and so as to put the grain into the best known condition for enduring the winter. This is specially important in the great prairie regions of the West, where the wheat is liable to be drawn out of the ground by the frost and have the dry winds carry away the earth from its roots while subjected to alternate freezing and sun-burning during the long winter, making it almost impossible to produce a fair crop in the usual ways.

I claim—

1. The combination of a furrow-opener, a seed-bed roller, a seed-dropper, and a cover-roller, arranged in series.

2. The combination of a rolling-cutter, furrow-opener, a seed-bed roller, a seed-dropper, and a cover-roller, arranged in series, as set forth.

3. The combination of a seed-bed roller provided with a face having a large portion approximately flat, a seed-dropper, and a cover-roller, arranged in series.

4. The combination of a furrow-opener, a seed-bed roller, a seed-dropper, a coverer, and a cover-roller, arranged in series.

5. A seed-planter provided with a number of series of furrow-openers, seed-bed rollers, seed-coverers, and cover-rollers, each series arranged for separate self-adjusting vertical motion while held true in place laterally.

6. A grain-planter having carrying-wheels and provided with gangs of several frames bearing floating rollers, arranged in series of two—one before the other—so that both rollers are capable of rising or falling together, and to produce rolled beds above and below the seed.

7. A grain-planter having a gang of several frames held at each end from lateral motion, and bearing floating rollers arranged to run upon the covered rows while held from lateral movement, and provided with beveled sides to produce rolled ridges between the rows.

8. A grain-planter having a gang of several frames held at each end from lateral motion, and bearing separately floating rollers arranged to run one on each row, and provided with beveled sides to produce rolled ridges between the rows.

9. A grain-planter having a gang of several separate frames bearing floating rollers with beveled sides located before the seed-droppers, and arranged to form approximately level seed-beds with rolled inclined sides.

In testimony whereof I affix my signature in the presence of two witnesses.

JOHN RANKIN NEWTON.

Witnesses:
JOHN F. SCOTT,
THOS. F. DUNN.